A. GARVER.
Improvement in Hay-Loaders.
No. 132,960. Patented Nov. 12, 1872.
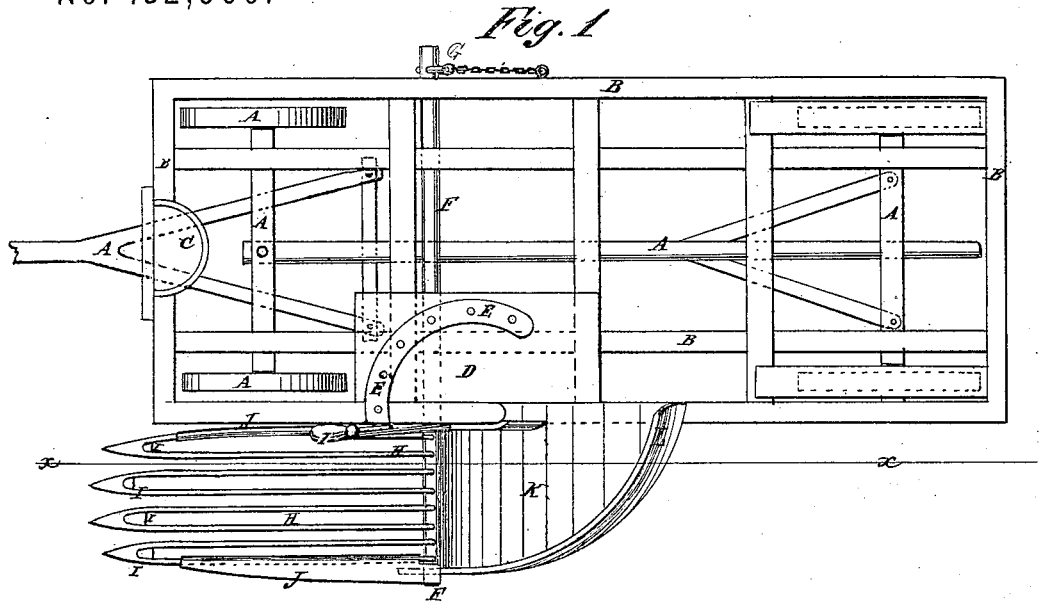
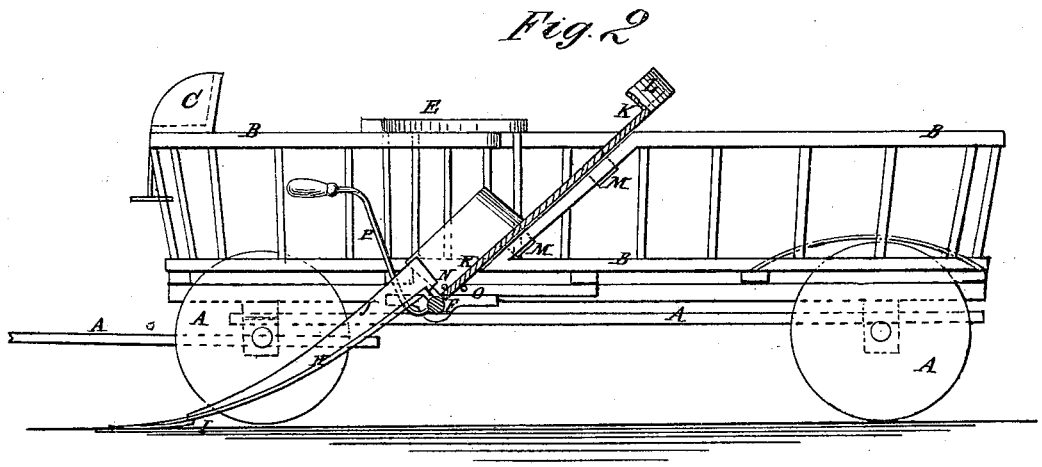

UNITED STATES PATENT OFFICE.

ANTHONY GARVER, OF LIME SPRING STATION, IOWA.

IMPROVEMENT IN HAY-LOADERS.

Specification forming part of Letters Patent No. 132,960, dated November 12, 1872.

*To all whom it may concern:*

Be it known that I, ANTHONY GARVER, of Lime Spring Station, in the county of Howard and State of Iowa, have invented a new and useful Improvement in Grain-Loaders, of which the following is a specification:

Figure 1 is a top view of a wagon and rack to which my improved loader has been applied. Fig. 2 is a side view of the same, partly in section, through the line $x\,x$, Fig. 1.

Similar letters of reference indicate corresponding parts.

My invention has for its object to furnish an improved device for loading loose grain, hay, &c., upon a wagon-rack which shall be so constructed as to enable the loading to be done easily and rapidly, thus avoiding the necessity of binding the grain, and thereby greatly diminishing the labor and expense of harvesting; and it consists in the construction and combination of various parts of the device, as hereinafter more fully described.

A represents a wagon about the construction of which there is nothing new. B is the rack, to the forward end of which is attached a seat, C, for the driver. In the middle part of one side of the rack B is formed an opening, the forward side of said opening being vertical and the other or rear side being inclined, as shown at Fig. 2. At the forward or vertical side of the said opening is formed a platform, D, for the raker to stand upon, which platform is provided with a semicircular railing, E, to protect the raker from the grain or hay when loaded upon the wagon. F is a shaft which passes through and works in bearings attached to the under side of the side bars of the rack B, a little in front of the opening in the side of said rack and so far in the rear of the forward wheels as to be out of the way of said wheels in turning. The shaft F is secured in place in its bearings by a pin, G, which is passed through it, and which is attached to the end of a short chain, the other end of which is attached to the rack B to prevent said pin from being lost. To the end of the shaft F, upon the side of the rack B in which the opening is formed, are rigidly attached long curved fingers H, the lower ends of which rest upon the ground so as to pass beneath the grain or hay. To the under side of the forward ends or points of the teeth H are attached shoes I to keep the teeth from running into the ground when crossing dead furrows and other uneven places in the ground. To the side fingers H are attached flanges or guards J to keep the grain or hay from falling off while passing up said fingers. K is an inclined platform, the outer edge of which is curved from the outer end of the shaft F to the top of the rack B, and is provided with an upwardly-projecting flange or guard L to keep the grain or hay from falling off said edge. The inner edge of the upper part of the platform K rests upon the inclined bar which forms the rear side of the opening in the side of the rack B where it is secured in place by hooks M attached to said platform and which hook over the said inclined bar. To the lower part of the rack B, or to the bearing for the shaft F, are attached two pins, N O, one of which, N, enters a hole in the inner lower part of the platform K, and upon the other, O, the said platform rests, as shown in Fig. 2. The lower edge of the platform K is hooked upon the shaft F, so that the grain or hay may pass directly from the fingers H to the said platform.

With this construction, as the wagon is drawn forward, the loose grain or hay is gathered by the fingers or teeth H, up which and up the platform K it is assisted by the raker with his rake. As the grain or hay passes upon the rack B it is received and arranged by the loader.

P is a lever, the lower end of which is attached to the shaft F, and its other end extends up in such a position that it may be conveniently reached by the operator to raise the fingers H from the ground in passing obstructions, turning around, &c.

When the load has been completed the device is detached and left in the field, or attached to a second wagon while the first is being unloaded.

Having thus described my invention, I claim as new and desire to secure by Letters Patent—

1. The combination of the detachable shaft

F, fingers or teeth H, guards J, and inclined platform K with each other to adapt them for attachment to a wagon-rack, substantially as herein shown and described and for the purpose set forth.

2. The rake H, and the platform K provided with the flange L, in combination with the rack B having a lateral opening adjacent to the platform and a support for the rake, as set forth.

ANTHONY GARVER.

Witnesses:
  C. S. THURBER,
  M. D. GUE,
  JAS. E. BENNETT.